United States Patent [19]

Hayashi et al.

[11] 4,374,671
[45] Feb. 22, 1983

[54] COLOR DEVELOPER, RECORDING UNIT HAVING A LAYER OF THE COLOR DEVELOPER AND PROCESS FOR PRODUCTION THEREOF

[76] Inventors: Takao Hayashi; Hajime Kato; Akio Miyamoto; Makoto Yoshida, all of Fujinomiya, Japan

[21] Appl. No.: 129,953

[22] Filed: Mar. 13, 1980

Related U.S. Application Data

[63] Continuation-in-part of Ser. No. 949,478, Oct. 10, 1978, abandoned, which is a continuation-in-part of Ser. No. 626,003, Oct. 28, 1975, abandoned, which is a continuation of Ser. No. 183,647, Sep. 24, 1971, abandoned.

[30] Foreign Application Priority Data

| | | |
|---|---|---|
| Sep. 24, 1970 [JP] | Japan | 45/83651 |
| Oct. 23, 1970 [JP] | Japan | 45/93245 |
| Dec. 15, 1970 [JP] | Japan | 45/112038 |
| Dec. 26, 1970 [JP] | Japan | 45/118979 |

[51] Int. Cl.$^3$ .................................................. C09D 11/00
[52] U.S. Cl. ...................................... 106/21; 282/27.5; 427/150

[58] Field of Search ................ 106/14.5, 21; 282/27.5; 427/150, 151; 428/307, 913, 914

[56] References Cited

U.S. PATENT DOCUMENTS

| | | | |
|---|---|---|---|
| 3,540,914 | 11/1970 | Chao-Han Lin | 428/306 |
| 3,924,027 | 12/1975 | Saito et al. | 427/147 |
| 3,934,070 | 11/1976 | Kimura et al. | 428/342 |
| 4,121,013 | 10/1978 | Miller et al. | 106/21 |

*Primary Examiner*—John Kight, III
*Assistant Examiner*—Amelia B. Yarbrough
*Attorney, Agent, or Firm*—Sughrue, Mion, Zinn, Macpeak & Seas

[57] ABSTRACT

A color developer containing a combination of zinc oxide, at least one salicylic acid or nuclear substituted salicylic acid, and at least one metal silicate as an inorganic pigment, and a recording unit having a layer of the color developer. The color developer has a high developing ability and is capable of forming a distinct color having a high light resistance when it is contacted with a color former.

12 Claims, No Drawings

COLOR DEVELOPER, RECORDING UNIT HAVING A LAYER OF THE COLOR DEVELOPER AND PROCESS FOR PRODUCTION THEREOF

CROSS REFERENCE TO RELATED APPLICATIONS

This application is a continuation-in-part application of copending application, Ser. No. 949,478, filed Oct. 10, 1978, now abandoned, which is a continuation-in-part application Ser. No. 626,003, filed Oct. 28, 1975, now abandoned, in turn a continuation application of Ser. No. 183,647, filed Sept. 24, 1971, now abandoned.

BACKGROUND OF THE INVENTION

1. Field of the Invention

The present invention relates to a color developer and a recording unit having a layer of the color developer coated on a support.

2. Description of the Prior Art

There have been known recording sheets utilizing a color reaction of a colorless organic compound (hereinafter referred to as a "color former") and an adsorbent material capable of forming a distinct color when contacted with the color former.

As the recording sheets using this phenomenon, a pressure-sensitive recording sheet (U.S. Pat. Nos. 2,505,470, 2,505,489, 2,550,471, 2,548,366, 2,712,507, 2,730,456, 2,730,457, 3,418,250, etc.) and a heat-sensitive recording sheet have been well known. Further, a printing method is known where an ink, containing the color former, is applied to the color developer sheet through a medium such as a stencil.

In all cases, the above phenomenon of the color reaction between the color former and the color developer are utilized under pressure with a pen or stylus, under heat, etc.

The color former may be dissolved in a solvent such as chlorinated diphenyl, chlorinated paraffin or other organic solvent. The solution may be dispersed in a binder and/or may be microencapsulated, and then coated onto a support such as paper, plastic film, resin-coated paper, etc.

In case of heat-sensitive recording sheets, the color former may be coated onto the support together with a thermofusible material such as acetoanilide which is melted under heating to dissolve the color former.

On the other hand, the color developer is dissolved or dispersed in water or in an organic solvent together with a binder such as a styrene-butadiene rubber latex and then coated on or impregnated into a base support before or directly before recording.

The color former and color developer may be coated onto the same surface or opposite surfaces of a support, or different supports.

Usually, after the color developer is coated onto the support, a desensitizer is locally coated thereon in order that unnecessary color formation be prevented in certain portions of the surface (U.S. Pat. No. 2,777,780). Another embodiment for the prevention of color formation is to locally coat the color developer on the support or the coated layer of color former without using the desensitizer.

As the above described color developer, there are clays such as acid clay, active clay, attapulgite, zeolite, bentonite, etc.; phenol resins (U.S. Pat. Nos. 3,516,845 and 3,540,911); and organic compounds such as succinic acid, tannic acid, gallic acid or phenol compounds (U.S. Pat. No. 3,244,548) are known. Such organic compounds are not practically employed for the reason that the color developing ability of the color developer sheet which is a support having coated thereon the color developer is very low and the color developer on the sheet is low in light resistance although the compound can be very easily handled in manufacturing the color developer sheet.

Further, in cases where the above color developer is locally coated onto a support to form a color developer sheet, only if a large amount thereof (7–10 g per 1 $m^2$ of the support) is coated, the color developer sheet can form sufficient color when contacted with the color former. Therefore, since locally coated portions of the color developer sheet are thicker than other portions, the color former coated on another support is locally pressurized to form unpreferable color (hereinafter referred to "fog") when contacted with the color developer sheet. As a result, the local coating method is limited.

SUMMARY OF THE INVENTION

An object of the present invention is to provide a color developer having an excellent color developing ability and able to form a color having an excellent light resistance.

Another object of the present invention is to provide a recording unit having a color developer layer having an excellent color developing ability and being able to form a color having an excellent light resistance.

Still another object of the present invention is to provide a process for producing the color developer and the recording unit having a layer of the color developer. The above-described objects can be attained by combining zinc oxide, at least one acid selected from the group consisting salicylic acid and nuclear substituted salicylic acids and at least one metal silicate as an inorganic pigment.

The color developer of the present invention can be produced by dissolving or dispersing zinc oxide, at least one of the acids and at least one metal silicate in an organic solvent. The color developer layer is produced by coating the thus obtained dispersion on a support and drying.

The color developer of the present invention is superior to an aromatic carboxylic acid, an anhydride thereof, a metallic compound and an inorganic pigment of a metal silicate, which are conventionally use in recording methods alone or in combinations of two compounds selected therefrom, in developing ability and in light resistance.

DESCRIPTION OF THE PREFERRED EMBODIMENTS

The salicylic acid compound used in the present invention can be represented by the following general formula:

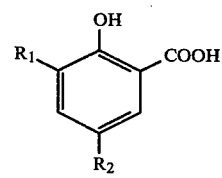

wherein $R_1$ and $R_2$ represents hydrogen, chlorine, a saturated and unsaturated alkyl group having 1 to 15 carbon atoms, a phenyl group, a cyclohexyl group, a phenyl alkyl group having 7 to 21 carbon atoms, an alkyl$^1$ phenyl alkyl$^2$ group wherein the alkyl$^1$ and alkyl$^2$ groups have 1 to 15 carbon atoms, a 1-hydroxy-2-carboxy benzyl group and a 4-hydroxy-3-carboxy benzyl group.

The nuclear substituted salicylic acid includes, for example, 5-tert-butylsalicylic acid, 3-phenylsalicylic acid, 3-methyl-5-tert-butylsalicylic acid, 3,5-di-isopropylsalicylic acid, 3,5-di-tert-butylsalicylic acid, 3,5-di-tert-amylsalicylic acid, 3-cyclohexylsalicylic acid, 5-cyclohexylsalicylic acid, 3-methyl-5-isoamylsalicylic acid, 5-isoamylsalicylic acid, 3,5-di-sec-butylsalicylic acid, 5-laurylsalicylic acid, 3-methyl-5-laurylsalicylic acid, 3-methylsalicylic acid, 2,4-cresotinic acid, 2,5-cresotinic acid, 2,3-cresotinic acid, 4-hydroxysalicylic acid, 5-hydroxysalicylic acid, 6-hydroxysalicylic acid, 5,5'-methylenesalicylic acid, anacardic acid, 5-benzyl-salicylic acid, 3,5-bis-(2-phenyl isopropyl)salicylic acid, 3-(2-phenyl-isopropyl)-5-methylsalicylic acid, 4-chlorosalicylic acid, etc.

The amount of the salicylic compound in the color developer of the present invention is more than 1 part by weight, desirably 2 to 100 parts by weight, per 100 parts by weight of zinc oxide. Further, for the purposes of increasing color developing ability and light resistance, at least one of inorganic metal silicate added to the color developer. The metal silicate includes aluminum silicate, zinc silicate, lead silicate, tin silicate, colloidal hydrated aluminum silicate, zeolite, bentonite, kaolinite, active clay, acid clay or talc, and the like. The amount of the inorganic pigment in the color developer is, usually, more than 1 parts by weight, preferably more than 5 parts by weight, per 100 parts by weight of the salicylic acid compound.

The color developer of the invention can be prepared by dissolving or dispersing zinc oxide, the acid and the metal silicate in an organic solvent such as methanol, ethanol, 2-propanol, butanol, ethyl acetate, butyl acetate, benzene, toluene, acetone, tetrahydrofuran or methylene chloride. Preferable solvents are those capable of dissolving the acid.

The thus prepared solution or dispersion can be coated onto a support, if necessary, together with a binder such as gum arabic, ethyl cellulose, styrene-butadiene copolymer, nitro-cellulose, styrene-butadiene latex, methylmethacrylate-butadiene latex, etc.

It should be noted that the coated layer of color developer can be maintained on the support even if the binder is not present in the layer.

The amount of the color developer coating composition is not specifically limited to obtain sufficient color. For example, it is more than 0.1 g/m$^2$, preferably 0.5–10 g/m$^2$. The upper limit of coating amount is not limited from the point of view of color developing activity, and the above range is only due to economic reasons.

The color developer composition can be coated onto a support by all kinds of coating methods. For example, zinc oxide and, the metal silicate may be coated onto the support with the binder, and then the dissolved or dispersed acid may be coated thereon.

As another embodiment for preparing a color developer composition, the binder is dissolved in the organic solvent and a plasticizer is added and then zinc oxide, the acid and the inorganic pigment of a metal silicate are dissolved or dispersed in the resulting solution.

The plasticizer may contain esters of phosphoric acid, phthalic acid, adipic acid or sebatic acid (e.g., tributyl phosphate, dibutyl phthalate, dioctyl phthalate, butyl adipate, dibutyl sebacate), hydrocarbons such as chlorinated paraffin; and glycerides of unsaturated fatty acids such as castor oil.

In this case, for the purpose of stabilizing the color developer composition which may be used as a coating ink, an alkali compound, i.e., an alkali metal salt of an organic acid or an inorganic alkali compound may be added to the composition. The alkali metal salt of an organic acid is, for example, a lithium salt, a sodium salt or a potassium salt of butylic acid, caprylic acid, palmitic acid, oleic acid, linoleic acid, linolenic acid, benzoic acid, and the like. The inorganic alkali compound may be, for example, sodium hydroxide, potassium hydroxide, sodium carbonate, sodium silicate, borax and conventional alkali compounds. The amount of the alkali compound is about 0.01–1 part by weight per 1 part by weight of the acid.

Each component may be dissolved or dispersed by means of a ball mill or sand mill.

Regardless of the method for production of the color developer and a color developer layer a salt of the salicylic acid compound is not produced as long as water is not used during mixing the above-described ingredients to produce the color developer. This has been confirmed by infrared spectrophotometry. An absorption peak can be observed at 1550–1610 cm$^{-1}$ (due to the presence of the carbonyl group of the salt) if the salt is produced in the developer, and an absorption peak can be observed at 1650–1670 cm$^{-1}$ (due to the presence of the carbonyl group of the acid in which an intramolecular hydrogen bond is produced) when the acid is present in the developer. The developers of the present invention which is produced as described hereinbefore and in the Examples do not have peaks of adsorption spectrum at 1550–1610 cm$^{-1}$ but have at 1650–1670 cm$^{-1}$.

The thus prepared color developer ink can be locally applied to a support.

A color developer sheet and the color developer of the invention can be used in combination with conventional color formers, such as crystal violet lactone, benzoyl leuco methylene blue, malachite green lactone, rhodamine B lactam, fluoranes (U.S. Pat. Nos. 3,501,331; 3,514,310; 3,514,311; 3,540,911), spiropyrans (U.S. Pat. No. 3,293,060), mixtures thereof, and the like.

The modification of the invention can be easily carried out by one skilled in the art in accordance with conventional information, techniques and the like.

The color formers for pressure-sensitive copying paper are ordinarily employed in combination in order to secure the instantaneous color forming property and light fastness of the colored image. For example, a combination of instantaneous color forming crystal violet lactone as a primary color former and benzoyl leucomethylene blue having an excellent light fastness has been most well known, however, the colored image obtained by contacting this combination of color formers with an aromatic carboxylic acid or its anhydride tends to disappear, when it is allowed to stand in a room or is exposed to sun light, since crystal violet fades before benzoyl leuco-methylene blue is color formed. However, such a defect as described above is removed in the present invention, since, on the color developer sheet using the salicylic acid compound, zinc oxide and a metal silicate in combination, crystal violet lactone is strong in light fastness and does not fade before the benzoyl leuco methylene blue is color formed. This will be clear from the light-fastness of crystal violet lactone in the below described Examples.

In comparison with conventional clay-coated paper, the color developer sheet of the present invention has the following advantages:

The conventional clay-coated paper tends to be decreased in sensitivity of clay, when being allowed to stand in air, because of adsorbing materials in air on the active point of clay. That is, the color developing ability of the color developer sheet is remarkably lowered with time.

In the color developer sheet of the present invention, such defect has been improved. And, in case of manufacturing a color developer sheet in accordance with the present invention, sufficient color developing ability and other properties necessary to the color developer sheet for pressure sensitive paper can be satisfied with smaller coating amounts than in the conventional clay paper. That is, the amount of color developer of the present invention to be coated is sufficient with 0.1 to 4 g/m$^2$ while in the conventional clay paper the amount to be coated of 7 to 10 g/m$^2$ is required. Thus, it is possible to make the color developer sheet by a size spray coating by means of a machine because only a small amount is required and the physical properties of the liquid can be freely varied different from clay, which results in a remarkable effect not only on performance but also on production.

Furthermore, the color developer of the present invention can give the similar color developing ability with smaller amounts (about 2 g/m$^2$) if a natural or synthetic high molecular weight substance or a water-repellant is previously coated onto the surface of the paper.

The present invention will be illustrated using a pressure-sensitive recording paper with the following Examples.

The effect of the color developer sheet of the present invention was confirmed with the following color former sheet.

Microcapsules containing a color former were manufactured, for example, according to the specification of U.S. Pat. No. 2,800,457 as follows:

10 parts by weight of acid-treated pig skin gelatin and 10 parts by weight of gum arabic were dissolved in 400 parts by weight of water at 40° C. and 0.2 part by weight of Turkey red oil was added thereto as an emulsiifier, and 40 parts by weight of color former oil were emulsified and dispersed therein.

The color former oil is 2% of crystal violet lactone or 3-dibenzylamino-7-diethylaminofluorane dissolved in an oil consisting of 4 parts by weight of chlorinated diphenyl and 1 part by weight of kerosene. The emulsification was stopped when the size of the oil droplets became 5 microns on an average. Water at 40° C. was added thereto to 900 parts by total weight and the stirring was continued. At this time attention must be paid so that the liquid temperature does not decrease below 40° C. Next, 10% acetic acid was added thereto to adjust the pH of the system to 4.0 to 4.2 and to cause coacervation. The stirring was further continued and, after 20 minutes, the system was cooled with ice to gelate a coacervate film deposited around an oil droplet. When the liquid temperature became 20° C., 7 parts by weight of 37% formaldehyde were added thereto and at 10° C., a 10% aqueous solution of caustic soda was added to adjust the pH to 0.9. At this time, addition of caustic soda must be carried out with sufficient attention.

The liquid temperature was raised to 50° C. by heat under stirring for 20 minutes. The microcapsules thus obtained were controlled to 30° C. and thereafter were coated onto a 40 g/m$^2$ paper in 6 g/m$^2$ as solid content and dried. Also in case of other color formers, the recording paper was manufactured in the same manner as described above.

EXAMPLE 1 AND COMPARATIVE EXAMPLE 1

30 g of salicylic acid and 5 g of ethyl cellulose were dissolved or dispersed in 300 ml of ethanol and thereafter 30 g of zinc oxide passing through a sieve of 325 mesh, and 40 g of colloidal hydrated aluminum silicate were dispersed therein under stirring. This dispersion liquid was coated onto a 50 g/m$^2$ paper so as to give 2 g/m$^2$ of solid content by means of a coating rod and dried.

For comparison, 30 g of salicylic acid and 5 g of ethyl cellulose were dissolved or dispersed in 300 g of ethanol; thereafter 30 g of zinc oxide was dispersed therein under stirring. The dispersion was coated onto a 50 g/m$^2$ paper so as to give 2.0 g/m$^2$ of solid content and dried.

COMPARATIVE TEST

The color developer sheets as prepared in Example 1 and Comparative Example 1 above were placed on color former sheet mentioned above (with crystal violet lactone) and pressurized under 600 kg/cm$^2$ to form color images. After allowing them to stand in the dark for 1 hour, spectral absorption curves at 400 to 700 mµ in wavelength were measured and the densities at maximum absorption were defined as the fresh density. Further, the spectral absorption curves of color images after exposure to sunlight for 1 hour were measured and the light fastness values were obtained by the following formula:

Light fastness value (%) = $\dfrac{\text{Density at the maximum absorption after exposure to sunlight}}{\text{Fresh density at the maximum absorption}} \times 100$ The results are shown in the following Table 1.

TABLE 1

| | Ingredients of the Coating Composition | | | | | Fresh Density | Light fastness after exposure to sunlight for 1 hour (%) |
|---|---|---|---|---|---|---|---|
| Example 1 | Salicylic acid | Zinc oxide | Colloidal hydrated aluminum silicate | Ethyl cellulose | Ethanol | 0.86 | 90.5 |
| Comparative | Salicylic | Zinc | — | Ethyl | " | 0.73 | 83.2 |

TABLE 1-continued

|  | Ingredients of the Coating Composition |  |  | Fresh Density | Light fastness after exposure to sunlight for 1 hour (%) |
|---|---|---|---|---|---|
| Example 1 | acid | oxide | cellulose |  |  |

EXAMPLE 2 AND COMPARATIVE EXAMPLE 2

The same experiments as in Example 1 and Comparative Example 1, respectively, were conducted except that a color former sheet containing 3-di-benzylamino-7-di-ethylaminofluorane was used. The results obtained are shown in Table 2.

TABLE 2

|  | Ingredients of the Coating Composition |  |  |  | Fresh density | Light fastness after exposure to sunlight for 1 hour (%) |
|---|---|---|---|---|---|---|---|
| Example 2 | Salicylic acid | Zinc oxide | Colloidal hydrated aluminum silicate | Ethyl cellulose | Ethanol | 0.96 | 95.0 |
| Comparative Example 2 | Salicylic acid | Zinc oxide | — | Ethyl cellulose | " | 0.88 | 83.6 |

From Tables 1 and 2, it has been found that the color developer sheet of the present invention is more excellent in color developing ability and light fastness than a color developer sheet using only salicylic acid and zinc oxide.

EXAMPLES 3-10

20 g of an acid, 20 g of zinc oxide, 30 g of a metal silicate, 2 g of ethyl cellulose and 300 ml of ethanol were used and the same experiments as in Example 1 were conducted.

Fresh density and the light fastness were measured as described hereinabove and the results are shown in the following Table 3.

TABLE 3

| Example No. | Acid | Metal Silicate | Fresh Density | Light fastness after exposure to sunlight for 1 hour (%) |
|---|---|---|---|---|
| 3 | 3,5-di-tert-Butyl Salicylic Acid | Kaolin | 0.89 | 0.81 |
| 4 | 3,5-di-tert-Butyl Salicylic Acid | Talc | 0.87 | 0.77 |
| 5 | 3,5-di-tert-Butyl Salicylic Acid | Acid Clay | 0.91 | 0.84 |
| 6 | 3,5-di-tert-Butyl Salicylic Acid | Colloidal Hydrated Aluminum Silicate | 0.90 | 0.78 |
| 7 | 5-tert-Butyl-salicylic Acid | Kaolin | 0.85 | 0.76 |
| 8 | 3,5-di-tert-Amylsalicylic Acid | Kaolin | 0.88 | 0.80 |
| 9 | 3-Cyclohexyl-salicylic Acid | Kaolin | 0.83 | 0.71 |
| 10 | 3-Phenylsalicylic Acid | Kaolin | 0.82 | 0.70 |

It can be seen in Table 3 that the color developer of the present invention has a high developing ability and the color obtained by using the color developer has an excellent light resistance.

COMPARATIVE EXAMPLES 3-6

The same experiment as in Examples 3-10 were conducted except that $TiO_2$, $SnO_2$, $BaSO_4$ and $CaSO_4$ were used instead of ZnO.

Thus obtained results are shown in Table 4 with the results obtained in Example 3 for comparison.

TABLE 4

| Comparative Example No. | Acid | Metal Compound | Silicate | Fresh Density | Light Fastness after Exposure to Sunlight for 1 hour (%) |
|---|---|---|---|---|---|
| 3 | 3,5-di-tert-Butylsalicylic Acid | $TiO_2$ | Kaolin | 0.57 | 0.19 |
| 4 | 3,5-di-tert-Butylsalicylic Acid | $SnO_2$ | " | 0.07 | 0.23 |
| 5 | 3,5-di-tert-Butylsalicylic Acid | $BaSO_4$ | " | 0.65 | 0.27 |
| 6 | 3,5-di-tert-Butylsalicylic Acid | $CaSO_4$ | " | 0.59 | 0.22 |
| Example 3 | 3,5-di-tert-Butylsalicylic Acid | ZnO | " | 0.89 | 0.81 |

It can be seen in Table 4 that when metal compounds other than zinc oxide are used low fresh density and light fastness are obtained.

COMPARATIVE EXAMPLES 7-19

In 300 ml of ethanol were dissolved or dispersed 2 g of ethyl cellulose and 20 g of Component I, as indicated in Table 5. In the thus obtained mixture were dispersed 20 g of Component II and 30 g of Component III to obtain a coating liquid.

The thus obtained coating liquid was coated onto a 40 g/m² paper so as to give 3 g/m² of solid content, and dried to obtain a color developer sheet.

The fresh density of the color developer were defined as in Example 1 and the thus obtained results are shown in Table 5.

TABLE 5

| Comparative Example No. | Component I | Component II | Component III | Fresh Density |
|---|---|---|---|---|
| 7 (Present Invention) | 3,5-di-tert-Butyl-salicylic Acid | ZnO | Kaolin | 0.90 |
| 8 | Adipic Acid | " | " | 0.02 |
| 9 | Gallic Acid | " | " | 0.11 |
| 10 | Pyrogallic Acid | " | " | 0.31 |
| 11 | Glycolic Acid | " | " | 0.02 |
| 12 | Citric Acid | " | " | 0.02 |
| 13 | Succinic Acid | " | " | 0.02 |
| 14 | Adipic Acid | " | " | 0.02 |
| 15 | p-Benzo Quinone | " | " | 0.02 |
| 16 | Catecol | " | " | 0.29 |
| 17 | Kaolin | " | " | 0.02 |
| 18 | Pyrophyllite | " | " | 0.04 |
| 19 | 3,5-di-tert-Butyl-salicylic Acid | — | " | 0.57 |

From the results thus obtained it can be concluded as shown below:

(1) The presence of an inorganic pigment of a metal silicate is necessary to obtain the effects of the present invention (see Examples 1 and 2 and Comparative Examples 1 and 2).

(2) A specific metal compound, i.e., zinc oxide must be used as a metal compound to obtain the effects of the present invention (see Example 3 and Comparative Examples 3–6).

(3) Only specific acids provide excellent results (see Comparative Examples Nos. 7–16).

(4) The effects of the present invention can not be obtained only by increasing the amount of an inorganic pigment of a metal silicate (see Comparative Example Nos. 17 and 18). The presence of salicylic acid is necessary to obtain effects of the present invention.

(5) The presence of zinc oxide is necessary to obtain the effects of the present invention (see Comparative Example No. 19).

What is claimed is:

1. A color developer capable of forming a distinct color when contacted with a color former, comprising zinc oxide, at least one acid selected from the group consisting of salicylic acid and nuclear substituted derivatives thereof and at least one metal silicate as an inorganic pigment in an amount sufficient to increase the color developing ability and light resistance of the color developer, said acid being present in an amount of about 1 to 100 parts by weight per 100 parts by weight of zinc oxide.

2. The color developer of claim 1 wherein said color developer further contains an alkali compound.

3. The color developer of claim 1, wherein said salicylic acid and nuclear substituted salicylic acid are represented by the following general formula:

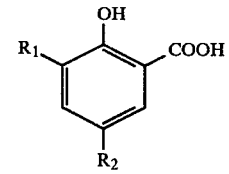

wherein $R_1$ and $R_2$ represent hydrogen, chlorine, a saturated and unsaturated alkyl group having 1 to 15 carbon atoms, a phenyl group, a cyclohexyl group, a phenyl alkyl group having 7 to 21 carbon atoms, an $alkyl^1$ phenyl $alkyl^2$ group wherein each $alkyl^1$ and $alkyl^2$ group have 1 to 15 carbon atoms, a 1-hydroxy-2-carboxy benzyl group or a 4-hydroxy-3-carboxy benzyl group.

4. The color developer of claim 1, wherein said nuclear substituted salicylic acid is 5-tert-butylsalicylic acid, 3-phenylsalicylic acid, 3-methyl-5-tert-butylsalicylic acid, 3,5-di-isopropylsalicylic acid, 3,5-di-tert-butylsalicylic acid, 3,5-di-tert-amylsalicylic acid, 3-cyclohexylcalicylic acid, 5-cyclohexylsalicylic acid, 3-methyl-5-isoamylsalicylic acid, 5-isoamylsalicylic acid, 3,5-di-sec-butylsalicylic acid, 5-laurylsalicylic acid, 3-methyl-5-laurylsalicylic acid, 3,5-dinitrosalicylic acid, 3-methylsalicylic acid, 2,4-cresotinic acid, 2,5-cresotinic acid, 2,3-cresotinic acid, 4-hydroxysalicylic acid, 5-hydroxysalicylic acid, 6-hydroxysalicylic acid, 5,5'-methylenesalicylic acid, anacardic acid, 5-benzylsalicylic acid, 3,5-bis-(2-phenyl isopropyl)salicylic acid, 3-(2-phenyl-isopropyl)-5-methylsalicilic acid or 4-chlorosalicylic acid.

5. The color developer of claim 1 wherein the metal silicate is aluminium silicate, zinc silicate, lead silicate, tin silicate, colloidal hydrated aluminium silicate, zeolite, bentonite, kaolinite, active clay, acid clay or talc.

6. The color developer of claim 1 wherein said color former is crystal violet lactone, benzoyl leuco methylene blue, malachite green lactone, rhodamine B lactam, fluoranes, spiropirans or mixtures thereof.

7. The color developer of claim 1 wherein said color former is crystal violet lactone.

8. The color developer of claim 2 wherein said alkali compound is an alkali metal salt of an organic acid.

9. The color developer of claim 2 wherein said alkali compound is sodium hydroxide, potassium hydroxide, sodium carbonate, sodium silicate or borax.

10. The color developer of claim 1, wherein said color developer is coated on a support to form a sheet of a recording unit.

11. A process for producing a color developer which comprises dissolving or dispersing zinc oxide, at least one acid selected from the group consisting of salicylic acid and nuclear substituted derivatives thereof and at least one metal silicate as an inorganic pigment in an organic solvent, the amount of said acid in the developer being 1 to 100 parts by weight per 100 parts by weight of zinc oxide and the amount of said metal silicate being sufficient to increase the color developing ability of the color developer and the light fastness of the color formed after reaction with a color former.

12. The process of claim 11, wherein said organic solvent is methanol, ethanol, 2-propanol, butanol, ethyl acetate, butyl acetate, benzene, toluene, acetone, tetrahydrofuran or methylene chloride.

* * * * *